US012731952B2

(12) United States Patent
Yaman et al.

(10) Patent No.: US 12,731,952 B2
(45) Date of Patent: Sep. 8, 2026

(54) DATA-DRIVEN MODELING OF ERBIUM DOPED FIBER AMPLIFIERS BY NEURAL NETWORKS

(71) Applicant: NEC Laboratories America, Inc., Princeton, NJ (US)

(72) Inventors: Fatih Yaman, Princeton, NJ (US); Hussam Batshon, Monroe, NJ (US); Eduardo Fabian Mateo Rodriguez, Tokyo (JP); Yoshihisa Inada, Tokyo (JP); Shinsuke Fujisawa, Tokyo (JP); Takanori Inoue, Tokyo (JP)

(73) Assignee: NEC Corporation, Tokyo (JP)

( * ) Notice: Subject to any disclaimer, the term of this patent is extended or adjusted under 35 U.S.C. 154(b) by 410 days.

(21) Appl. No.: 18/414,425

(22) Filed: Jan. 16, 2024

(65) Prior Publication Data

US 2024/0243540 A1 Jul. 18, 2024

Related U.S. Application Data

(60) Provisional application No. 63/500,113, filed on May 4, 2023, provisional application No. 63/480,369, filed on Jan. 18, 2023.

(51) Int. Cl.
*H01S 3/10* (2006.01)

(52) U.S. Cl.
CPC ...... *H01S 3/10015* (2013.01); *H01S 2301/04* (2013.01)

(58) Field of Classification Search
CPC ......................... H01S 3/10015; H01S 2301/04
USPC .................................................... 359/341.41
See application file for complete search history.

(56) References Cited

U.S. PATENT DOCUMENTS

2020/0057961 A1* 2/2020 Vahdat .................. G06N 20/00
2022/0329033 A1 10/2022 Demars et al.
2023/0111693 A1* 4/2023 Slovak .............. H04B 10/2916 398/79

* cited by examiner

*Primary Examiner* — Daniel A Hess
(74) *Attorney, Agent, or Firm* — Vincent Duffy

(57) ABSTRACT

Dependence of EDFA gain shape on input power and input spectrum shape is modelled using a simple neural network-based architecture for amplifiers with different gains and output powers. The model can predict the gain within ±0.1 dB. While the model has good success predicting the performance of an EDFA it is trained with, it is not as successful when predicting a different EDFA, or the same EDFA with different pump power. Retraining the model with a small amount of supplementary data from a separate EDFA makes the model able to predict the performance of the second EDFA with little loss in performance. Experiments show that machine learning model of an EDFA is capable of modelling spectralhole burning effects accurately. As a result, it significantly outperforms black-box models that neglect inhomogenous effects. Model achieves an average RMSE error of 0.016 dB between the model and measurements.

5 Claims, 7 Drawing Sheets

| | Pump (mW) | $P_{ref}$ (dBm) | $G_{ref}$ (dB) | Label |
|---|---|---|---|---|
| High gain | 140 | 0.9 | 15.9 | H_140 |
| | 230 | 3.7 | 15.9 | H_230 |
| Low gain | 230 | 6.2 | 12.9 | L_230 |
| | 330 | 7.7 | 12.9 | L_330 |

FIG. 3

DATA-DRIVEN MODELING OF ERBIUM DOPED FIBER AMPLIFIERS BY NEURAL NETWORKS

CROSS-REFERENCE TO RELATED APPLICATIONS

This application claims the benefit of U.S. Provisional Patent Application Ser. No. 63/480,309 filed Jan. 18, 2023, and U.S. Provisional Patent Application Ser. No. 63/500,113 filed May 4, 2023, the entire contents of each is incorporated by reference as if set forth at length herein.

FIELD OF THE INVENTION

This application relates generally to optical telecommunications transmission systems. More particularly, it pertains to the modeling of Erbium-doped fiber amplifiers (EDFAs) with neural networks and an accurate prediction of spectral hole burning in EDFAs.

BACKGROUND OF THE INVENTION

As is known in the art, submarine cables play a critical backbone role in global telecommunications. Therefore, improving the performance of submarine cables in terms of cost per bit either by improving transmission performance, or reliability is essential. A fundamental asset when optimizing the performance of a cable system is high quality modelling tools, especially for erbium-doped fibre amplifiers (EDFAs) which are the main active modules in submarine optical fiber cables.

Even though EDFAs have not changed fundamentally recently, and there are mature tools for modelling them, (See, e.g., G. C. Randy, and E. Desurvire, "Modeling erbium-doped fiber amplifiers." J. Light. Technol vol. 9 271-283 (1991), submarine systems can still benefit significantly from improving these models. One reason is that submarine systems use many EDFAs in a cascade. As a result, even small mismatches can grow significantly, thereby necessitating the use of many tilt or gain shape correction stages along the length of cable. Yet another motivation is that a small portion of power feed, a performance limiting resource for many cable systems, is wasted on gain shape management of EDFAs. Better EDFA models may be employed to reduce this loss (See, e.g., J. K. Perin, J. M. Kahn, J. D. Downie, J. Hurley, and K. Bennett, "Importance of amplifier physics in maximizing the capacity of submarine links." J. Light. Technol. vol. 37, 2076-2085 (2019).

Recently data-driven methods for building accurate models of EDFA have been demonstrated (See, e.g. E. R. Hartling, A. i Pilipetskii, D. Evans, E. Mateo, M. Salsi, P. Pecci, and P. Mehta, "Design, acceptance and capacity of subsea open cables." J. Light. Technol. Vol. 39, 742-756 (2021)., P. Mertz, S. Grubb, J. Rahn, W. Sande, M. Stephens, J. O'Connor, M. Mitchell, and S. Voll, "Record ultra-high full-fill capacity trans-atlantic submarine deployment ushering in the SDM era." Optical Fiber Communications Conference and Exhibition (OFC), M2D.1, (2020)., C. J. A. Bastos-Filho, E. A. Barboza, and J. F. Martins-Filho, "Estimating the spectral gain and the noise figure of EDFA using artificial neural networks." IEEE International Conference on Transparent Optical Networks (ICTON), We.A1.5., (2017)., F. Da Ros, U. C. De Moura, and M. P. Yankov, "Machine learning-based EDFA gain model generalizable to multiple physical devices." IEEE European Conference on Optical Communications (ECOC), (2020)., and J. Yu, S. Zhu, C. L. Gutterman, G. Zussman, and D. C. Kilper, "Machine-learning-based EDFA gain estimation." Journal of Optical Communications and Networking vol. 13, 83-91 (2021)), These methods disclose promising techniques to improve the accuracy of the EDFA models further. One of the challenges with these methods is that the number of measurements required to achieve a sufficiently accurate model can be in the thousands or even tens of thousands.

Measuring tens of thousands of data points is generally not problematic, however, considering that some submarine cables can include thousands of EDFAs, it is not practical to individually model each EDFA. As a result, techniques that provide the generalization of a model obtained from one EDFA to other EDFAs—with minimal loss of accuracy—would represent a welcome addition to the art.

SUMMARY OF THE INVENTION

An advance in the art is made according to aspects of the present disclosure directed to data driven modeling of EDFAs.

In sharp contrast to the prior art, our inventive methods permit the generalization of a model from one EDFA to another EDFA with minimal loss of accuracy. Our inventive method reduces such loss of accuracy by performing a relatively small number of additional measurements and using those to retrain a model and use that retrained model for a new EDFA.

BRIEF DESCRIPTION OF THE DRAWING

FIG. 3 shows data for amplifiers and their parameters used for training and testing according to aspects of the present disclosure.

DETAILED DESCRIPTION OF THE INVENTION

Figure 1:
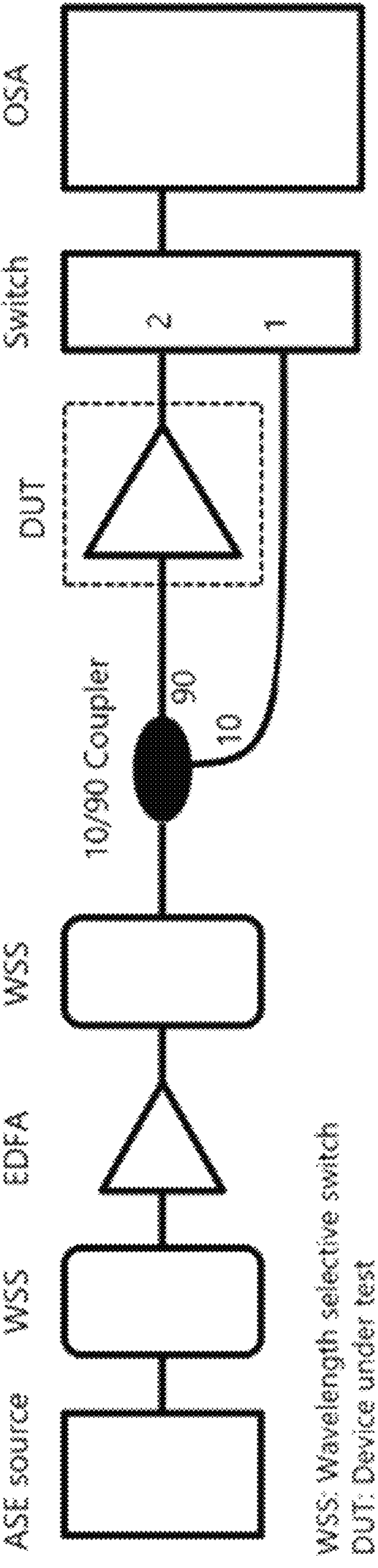
FIG. 1 is a schematic diagram showing an illustrative experimental setup according to aspects of the present disclosure.

The following merely illustrates the principles of this disclosure. It will thus be appreciated that those skilled in the art will be able to devise various arrangements which, although not explicitly described or shown herein, embody the principles of the disclosure and are included within its spirit and scope.

Furthermore, all examples and conditional language recited herein are intended to be only for pedagogical purposes to aid the reader in understanding the principles of the disclosure and the concepts contributed by the inventor(s) to furthering the art and are to be construed as being without limitation to such specifically recited examples and conditions.

Moreover, all statements herein reciting principles, aspects, and embodiments of the disclosure, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that any block diagrams herein represent conceptual views of illustrative circuitry embodying the principles of the disclosure.

Unless otherwise explicitly specified herein, the FIGs. comprising the drawing are not drawn to scale.

EXPERIMENTAL SETUP

FIG. 1 shows an illustrative experimental set up used to collect training and testing data. As illustrated, an amplified spontaneous emission (ASE) source is used to provide a nearly flat input. Using a wavelength-selective switch (WSS), the ASE is flattened and carved to produce 46 peaks of 50 GHz width at a 100 GHz spacing covering the C-band from 191.5 THz to 196 THz. Following an amplifier, a second WSS is used to impart random attenuation to the 46 peaks.

The random attenuations in dB scale are created from random-walk patterns generated from Gaussian distribution having a standard deviation of 0.25 db. In addition, overall attenuation level is also randomly swept within a predefined range. With the help of a 10/90 coupler and an optical switch, the input and the output of the amplifier which is the device under test (DUT) in FIG. 1 is measured in rapid succession with an OSA.

Figure 2:
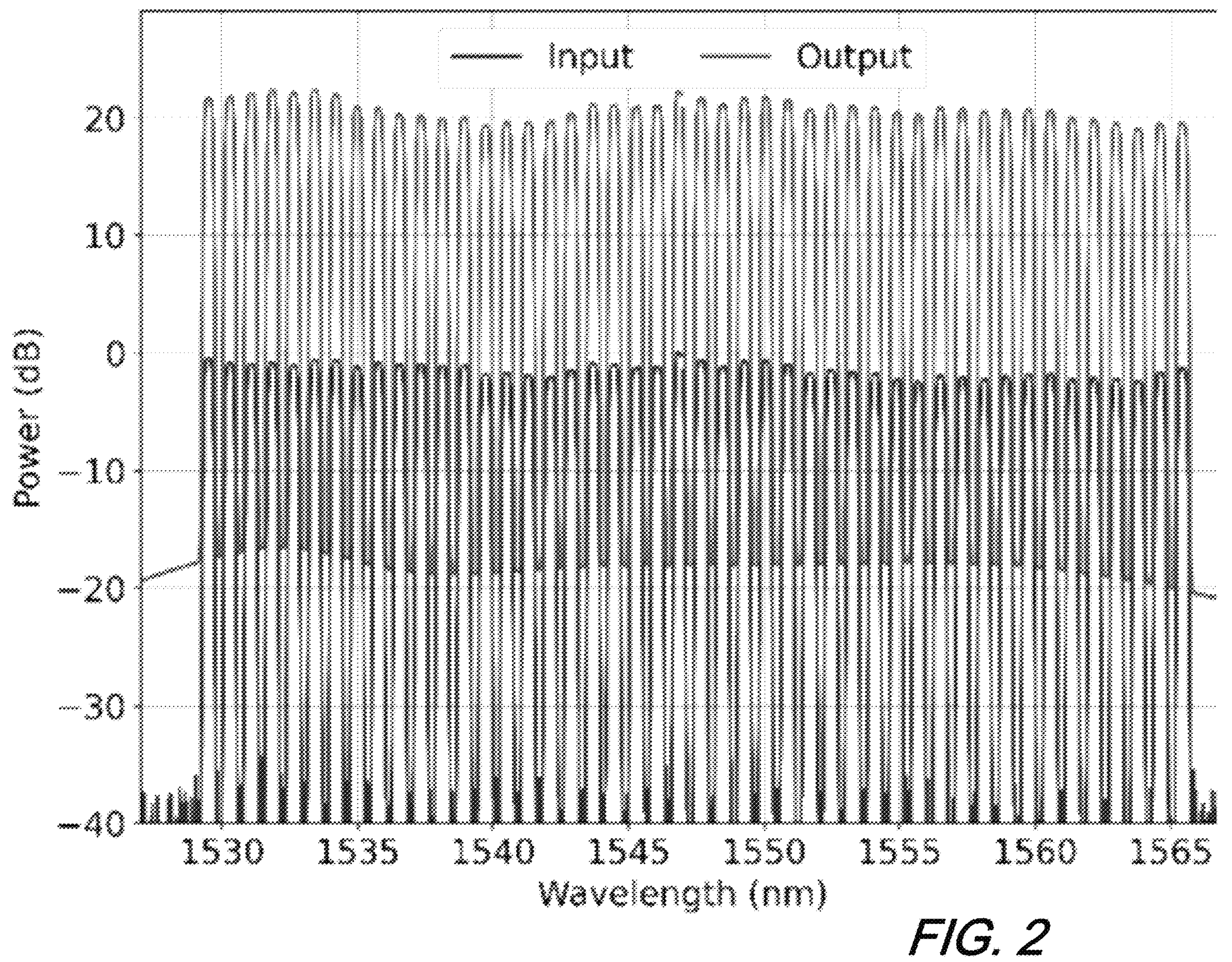
FIG. 2 shows an example of the input and output spectrum as measured by the OSA according to aspects of the present disclosure.

FIG. 2 shows an example of the input and output spectrum as measured by the OSA.

After obtaining the input and output spectra, the power in each peak is calculated, culminating in the 46-point input and the corresponding gain. For modelling, about 40000 random spectra are measured. In addition to the randomly shaped input spectra, a flat input spectrum is generated and gain corresponding to flat spectrum at varying power levels are measured.

Two separate amplifiers, a high gain one and a lower gain one, are employed. Their illustrative parameters are shown in FIG. 3. Preferably, the amplifiers are constructed using components from the same manufacturing lot/batch, i.e. same spool of erbium-doped fibre (EDF), pump diodes, couplers, isolators etc. No GFFs used.

As configured, the high gain amplifier has a longer EDF resulting in 3 dB higher reference gain $G_{ref}$. $G_{ref}$. In this context is defined as the average gain value corresponding to the input power level when the gain tilt is zero. Gain tilt is defined as the slope of the linear fit to the gain vs wavelength in units of dB/nm. The reference power $P_{ref}$ is the input power corresponding to the reference gain. Measurements are repeated for two pump values for each pump. The last column in the FIG. 3 shows the labels that will be used for the measurement conditions in the plots.

FIG. 3 shows the average gain calculated from the 40000 separate random spectra versus the corresponding input powers for the case of a high gain amplifier with 230 mW pump. On the same plot, the average gain values measured for the flat spectrum with 18 input power values from—6 dBm to 11 dBm in increments of 1 dB are also shown. The dashed line illustrates the linear fitting to the dependence of the gain with respect the input power when the input spectrum is flat.

As evident in the figure, the average gain depends strongly on the input power, however, for a fixed input power there is a distribution of average gain value which is determined by the shape of the input spectrum. In a way, this dependency is what is aimed to be modelled in this work.

Neural-Network Architecture

For data-driven modelling a simple, fully connected neural network is chosen. The input and output layers have 48 and 46 nodes, respectively. The first inner layer has 256 nodes while the remaining three inner layers have 128 nodes. Activation function is chosen to be RELU for each node. The neural network is implemented in a Tensorflow platform. Adam optimization algorithm is used as the stochastic gradient descent method with the maximum square error as the cost function.

The input node values are prepared as follows. First, the reference input power $P_{ref}$, is determined using the flat input gain measurements. Next, the total input power is calculated from the input spectrum. The difference between this input power and the reference power $P_{ref}$ becomes the input to the first node of the first layer, e.g. AP in FIG. 4, which is a pair of plots showing illustrative examples of input and output spectra according to aspects of the present disclosure.

Using the flat input measurements as a function of the input power, a linear fit is obtained, as shown by the dashed line in the example shown in the figure. Using this linear fit, the expected gain value at the input power is estimated, as shown by the black pentagon marker in FIG. 4. This estimated flat-input gain value, $G_{est}$(AP) becomes input for the second node on the input layer. The remainder of the 46 nodes of the input layer is the input spectrum, except they are normalized to a total power of 0 dBm. The output layer nodes on the other hand correspond directly to the measured/predicted gain for the 46 wavelength points. The measured data sets are split in a 0.5:0.25:0.25 ratio for the training, validation and testing sets.

Figure 4:
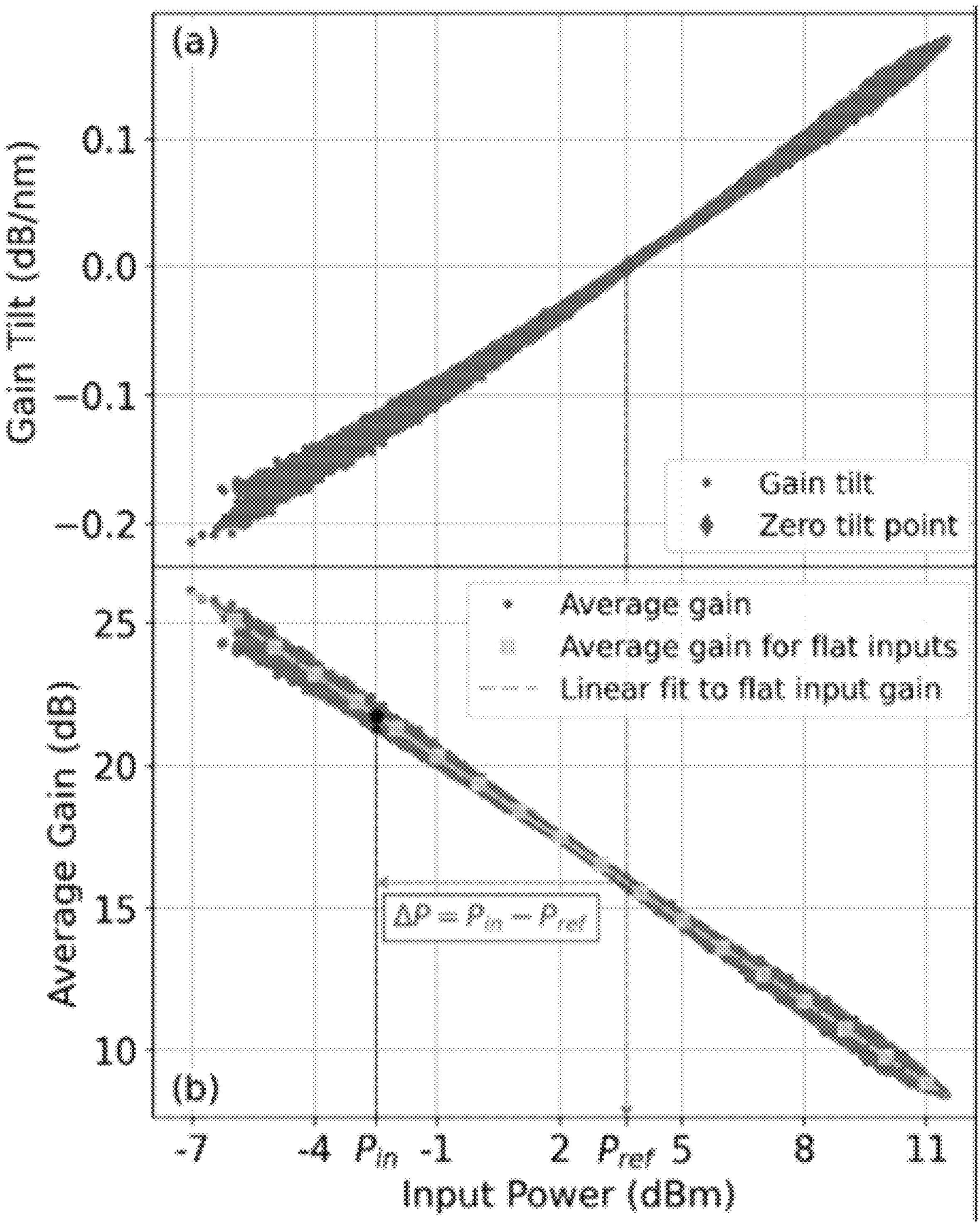
FIG. 4 is a pair of plots showing illustrative examples of input and output spectra according to aspects of the present disclosure.
Figure 5:
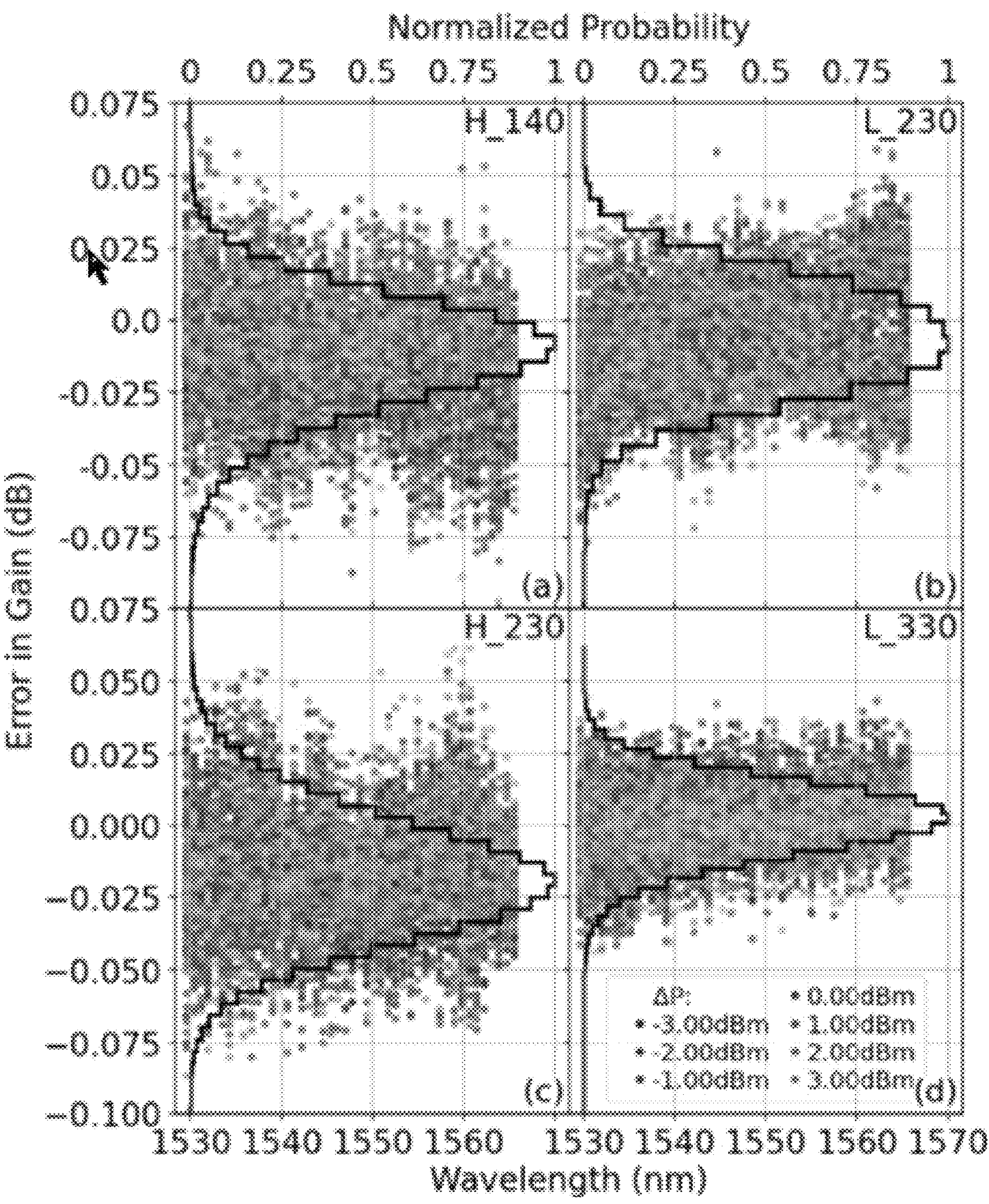
FIG. 5 is a series of plots showing error between the measured and predicted gain for the 4 EDFAs of FIG. 4 as a function of wavelength. The curves show the normalized probability distribution for the error. Measurements are coded according to input power with respect to reference points according to aspects of the present disclosure.

From the results presented in FIG. 5—which is a series of plots showing error between the measured and predicted gain for the 4 EDFAs of FIG. 4 as a function of wavelength. The curves show the normalized probability distribution for the error. Measurements are coded according to input power with respect to reference points according to aspects of the present disclosure—it can be seen that the maximum error remains less than ±0.1 dB for all cases. Moreover, dependence of error on the wavelength and input power remains small. This is the case if we train a model for each case separately. However, the question remains, whether it is possible to train a single model using only one of the EDFAs with a single pump power, and still predict the gain for all other three cases.

The way the neural network is trained, it is not possible to directly predict the gain for an amplifier using a model built from a separate amplifier since the reference power, as well as the estimated gain is needed as inputs to the network. However, these values can be determined by measuring the gain using flat input spectrum with several input powers. Considering the curves in FIG. 4, for the EDFA for which the training is performed, thousands of data points are taken, but for the other EDFA that is under test, only the data points shown in squares would be needed. To predict the gain for an input for the test EDFA, ΔP, and Gest(ΔP) are obtained from the flat input measurements and combined with the 46-point normalized input spectrum to be the input for the model.

Figure 6:
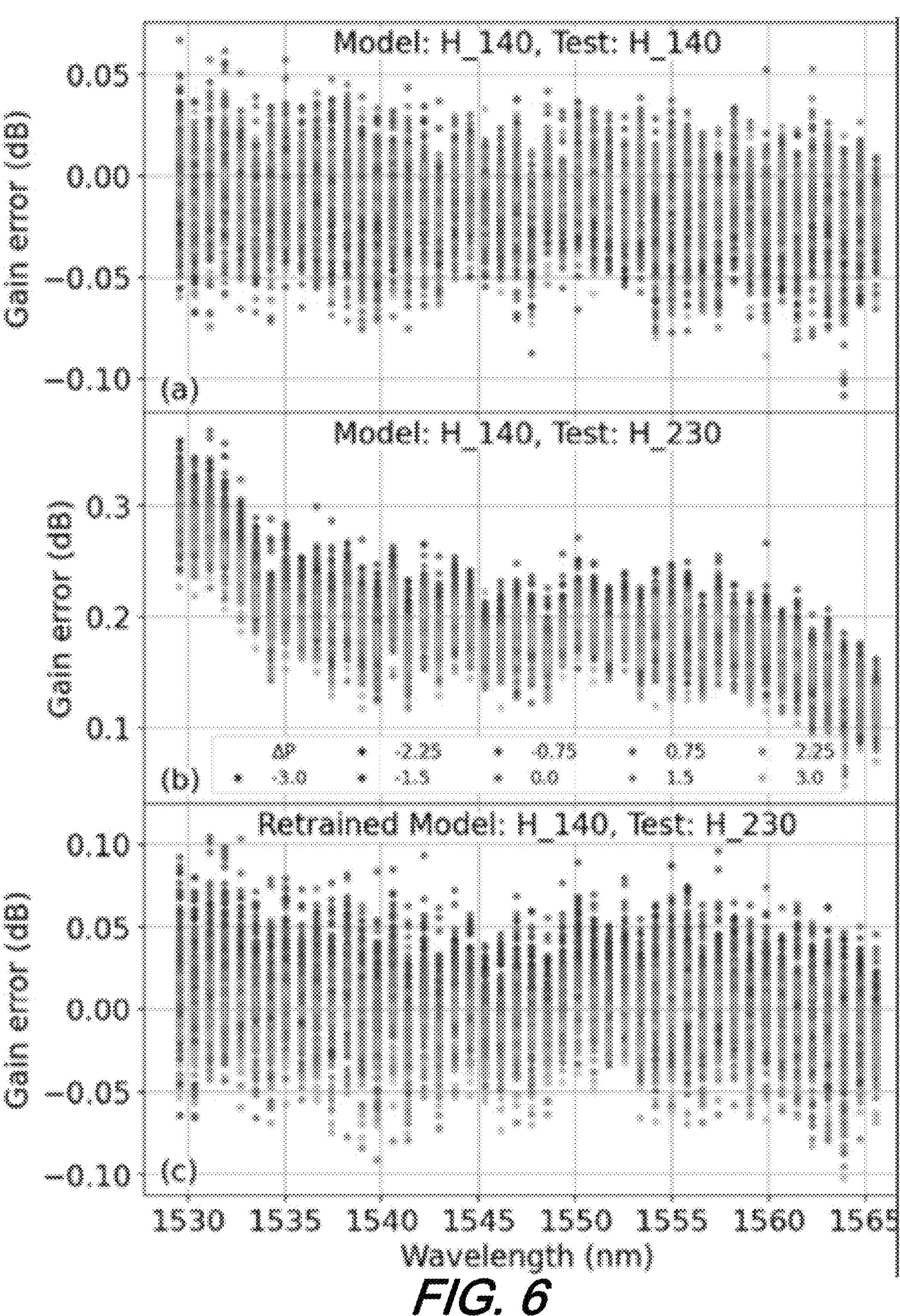
FIG. 6 is a series of plots showing error between the measured and predicted gain when (A) training and test data are both EDFA H_140, (B) when training data for the model is from EDFA H_140 but the testing data is from H_230 (C) same as (B) but the model is retrained with supplementary data from H_230 according to aspects of the present disclosure.

FIG. 6 is a series of plots showing error between the measured and predicted gain when (A) training and test data are both EDFA H_140, (B) when training data for the model is from EDFA H_140 but the testing data is from H_230 (C) same as (B) but the model is retrained with supplementary data from H_230 according to aspects of the present disclosure.

FIG. 6 shows how the prediction deteriorates when a model for another EDFA is used directly, i.e. in the case of cross testing. A first plot of FIG. 6—label (A)—which is the same as FIG. 5 shows as a reference when the model generated for the EDFA H_140 is used to predict the test data from the same EDFA. FIG. 6—label (B)—on the other hand shows when the same model is used to predict the test data generated by EDFA H_230. Clearly the error is much larger. Error now depends on the wavelength as well as the input power, with it performing worse for the lower input powers.

To improve the prediction error, we use retraining of the model with limited supplementary data from the testing EDFA. The supplementary data can be chosen in many ways however, a simple option is to generate flat input with varying input power levels, and also input spectra with varying linear tilts. To test this method, we measured gain for 21 linearly tilted spectra with slopes varying from −0.5 dB/nm to 0.5 dB/nm in steps of 0.05 dB/nm. For each tilted spectrum, power is varied from −6 dB below the reference power to 5 dB above the reference power in steps of one dB. In total 231 measurements are taken.

FIG. 6—label (C) shows the gain error when the model generated for EDFA H_140 is retrained with 231 supplementary data taken for EDFA H_230 before testing it with the test data from EDFA H_230. It can be seen from the comparison of FIG. 6 label (B) and FIG. 6—label (C) that, after retraining the model with this supplementary data, the error is reduced significantly, even though some dependence on the input power level is still noticeable.

To see the impact of retraining on cross testing for other combinations of EDFAs supplementary data is taken for all the EDFAs. Cross testing with and without the retraining is implemented. The results are summarized in FIG. 7—which is a series of plots showing maximum absolute error between the measured and predicted gain versus the model used for testing where ST: Using the model generated for the same EDFA as test EDFA, CT: model is generated for a different EDFA, CTwR: model is generated for a different EDFA but retrained using supplementary data from the tested EDFA according to aspects of the present disclosure—with 12 different combinations between the 4 cases shown in Table 1. To show the overall improvement absolute value of the maximum error in gain prediction is plotted for three cases.

First case is the reference self-test (ST), meaning that the data used for training the model and the data used for testing are generated from the same data. The second case is the cross-testing (CT). In this case, the model that is used for prediction is generated from data measured from one EDFA, but the data used for testing is measured from another EDFA. The third case is the cross-testing with retraining (CTwR). In this case, the model is from another EDFA, but it is retrained with supplementary data taken for the testing EDFA. For instance, in FIG. 7—label (A), for the self-testing case the model is generated by training on data obtained from EDFA H_230, as well as the data used for testing. For the cross-testing case, the model is generated by training on data obtained from EDFA H_140, while the data for testing is still from EDFA H_230. For the case with the retraining, the model generated from H_140 is retrained with 231 supplementary data obtained from H_230, then this retrained model is used to do the prediction on the test data obtained from EDFA H_230. The line shows when the testing and modelled EDFAs are reversed.

Figure 7:
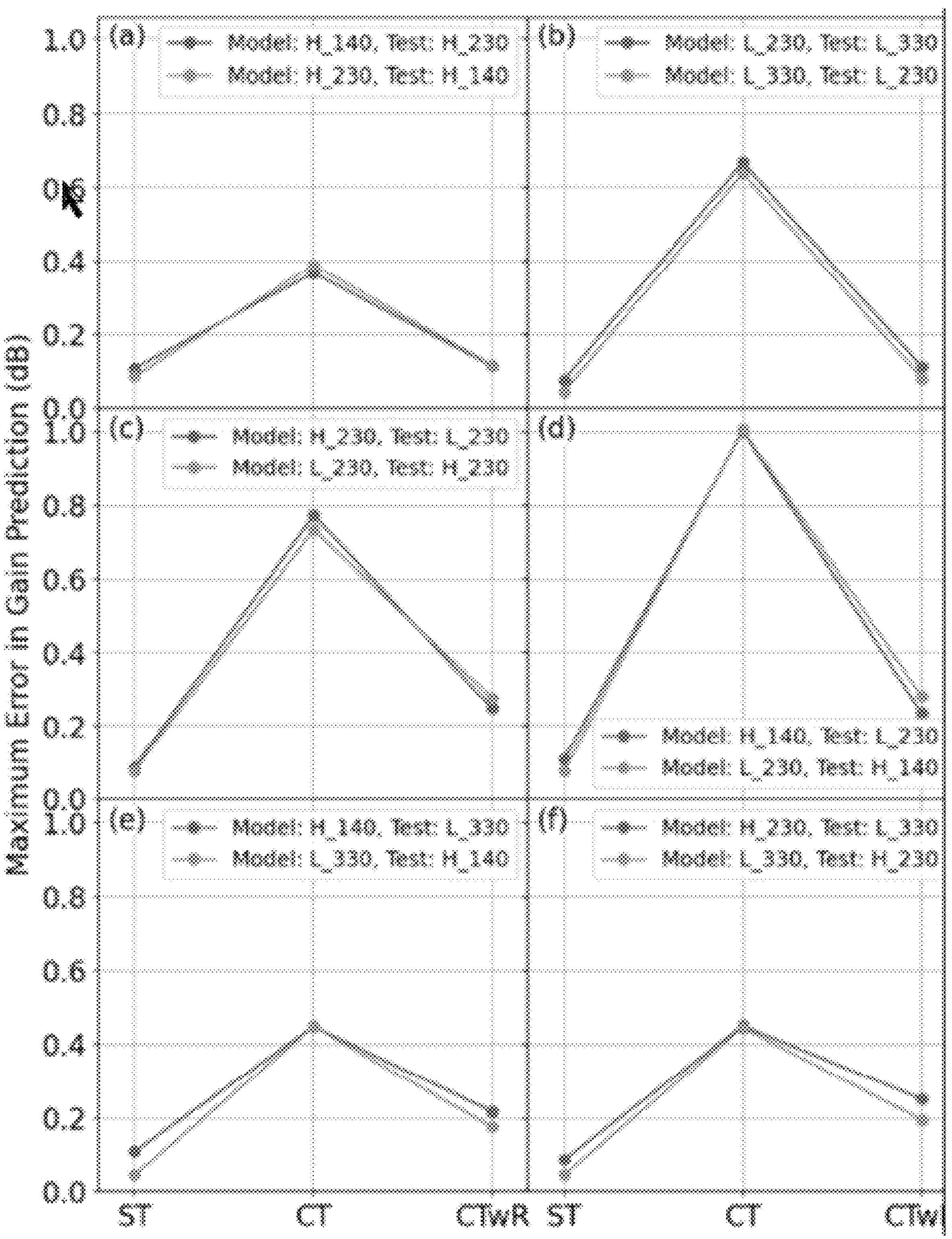
FIG. 7 is a series of plots showing maximum absolute error between the measured and predicted gain versus the model used for testing where ST: Using the model generated for the same EDFA as test EDFA, CT: model is generated for a different EDFA, CTwR: model is generated for a different EDFA but retrained using supplementary data from the tested EDFA according to aspects of the present disclosure.

The most obvious trend shown in FIG. 7 label (A) is that without retraining, the prediction error grows significantly if the model generated for one EDFA is used for another. This holds even when the EDFA is the same but only the pump power is changed, as it can be seen from FIG. 7 label (A) and FIG. 7—label (B). However, after retraining, the error is significantly reduced, especially when the comparison is for the same EDFA but between two different pump powers. In this case the error level is almost same as self-testing As we have previously noted and will be readily understood, Erbium-doped fibre amplifiers (EDFAs) are one of the key enablers of modern optical transmission systems. Obtaining accurate models of EDFAs are critical optimizing system designs]. Accuracy of the models become especially important for subsea systems and other long-haul transmission systems that cascade many EDFAs. In these systems even small omissions, or inaccuracies grow to significantly effect system performance. One of these effects is spectral hole burning (SHB). Due to difficulty of incorporating SHB effect, many models in particular so called black-box (BB) models make the simplifying assumption that EDFAs have only homogenous broadening and neglect inhomogenous effects including SHB. Recently, machine learning (ML) techniques have been proposed for a more holistic approach in hopes of incorporating all the effects including SHB, even though it requires significantly more effort to generate.

However, so far there has not been a direct comparison of ML models with BB models to show benefit of using ML models over simpler BB models. Moreover, even though one of the main motivations behind the ML models is modelling inhomogenous effects such as SHB, it has not been demonstrated clearly.

In this disclosure we show results of the direct comparison of our ML model with a BB model on the same data. We chose this BB model for comparison since it still performs better than some ML models published recently. We show that our model not only performs significantly better, but it performs better than the ultimate limit of the BB model. Furthermore, we show that the ML model does learn SHB even when training is performed with only a single EDFA. This also settles the question whether SHB effect is large enough, and measurements can be made accurate enough that ML models can detect and learn from measurements from a single EDFA. Finally, the prediction error we achieve, i.e., average root-mean square error (RMSE) of 0.016 dB, and average of maximum absolute error (MAE) of 0.04 dB is the best reported performance to best of our knowledge.

Experiment

FIG. 1 shows the experimental set up. An amplified spontaneous emission (ASE) noise source is carved in to 47 channels of 50 GHz bandwidth at 100 GHz spacing from 191.4 THz to 196 THz. Each channel is randomly and independently attenuated up to 10 dB with a uniform distribution in dB scale, as it can be seen in FIG. 1(*b*). In addition to the pre-emphasis, the input power level is swept over a 13-dB range from −3 dBm to 10 dBm. The histogram of the measured input power level, as well as its break down into the training, and testing sets are shown in FIG. 1(*c*) on the right axis. From the total of 40000 sets measured, 23100 are used for training, 9900 for validation and 4380 for testing, all with the same EDFA with a 250-mW pump and without a gain flattening filter (GFF). The EDFA has an average gain of 12.6 dB and a zero-gain slope at 6.7 dBm input power. In the same figure the average gain corresponding to the input power is also shown with block dots on the left axis. In addition, flat input spectra are measured from −3.3 dBm to 13.7 dBm in steps of 1 dB to implement the BB method.

To demonstrate that the ML model can learn and predict SHB, a set of SHB "stress test" measurements are conducted. The measurements are taken in the same fashion as they were taken in a recent measurement of SHB over a straight-line testbed. First, a flat input spectrum is prepared at 7.7 dBm. Then each channel is pre-emphasized one by one from −6 dB to 6 dB in 1 dB steps, and the gain is measured.

Machine Learning and Black Box Models

The ML model is a fully connected neural network (NN) with input and output layers with 47 nodes equal to the number of channels, with 4 layers in between with 135 nodes each. The input layers take in the input power in each channel in linear units. Output nodes produce the gain value in reference to the gain shape measured at 6.7 dBm with a flat input which results in zero gain slope. This reference gain shape is a minimum squared error. Note that the reference gain shape may be added to prediction. Activation function is ReLu and Adam optimization method may be used while monitoring minimum square error.

The BB model is described in detail here. The BB model was separated into three categories, as the flat-gain model, the preemphasis-aware model, and the ultimate limit which will be referred to as BB-flat, BB, and BBult from here on, respectively. Performance of the models are evaluated in terms of RMSE defined the same way as in $$RMSE = \sqrt{1/N_{ch}\sum_{i=1}^{N_{ch}}\left(\hat{G}_i - G_i\right)^2} \text{ where } N_{ch} = 47$$

is the number of channels, $G_i$ and $\hat{G}_i$ are the measured and predicted gain for the ith channel in dB scale.

The BB model improves upon the flat gain model and reduces the average RMSE from 0.96 dB to 0.44 dB. The ultimate limit under the homogenous broadening assumption improves it further down to 0.03 dB. The ML model reduces it by another 80% to 0.016 dB.

The main limitation of the BB model is that it assumes there is no inhomogenous effects such as SHB. To see whether the improvement of the ML model derives from its ability learn SHB effects on top of homogenous effects, the models are compared over the SHB stress-test data taken in the same way. For easier comparison, the measured spectra are plotted in reference to the flat input gain spectrum defined as the gain deviation $$GD_{\lambda_{CUT}}(\lambda) = G_{\lambda_{CUT}}(\lambda) - G_{flat}(\lambda),$$

where $$G_{\lambda_{CUT}}(\lambda)$$

is the gain spectrum when the channel under test with wavelength $\lambda_{CUT}$ is pre-emphasized, and, Gflat(I) is the gain spectrum when the input is flat, i.e., no channel is pre-emphasized We note that both BB models completely miss the inhomogenous gain saturation effect as expected. Moreover, for cases of deeper pre-emphasis, accuracy of BB model gets worse even at parts of the spectrum far from the inhomogenous saturation region. ML model on the other hand very closely predicts the gain spectrum including the SHB effect.

At the short wavelengths the saturation is easy to see where the SHB creates a deeper and narrower saturation effect. At longer wavelengths, the saturation is shallower and broader, therefore more difficult to discern visually from the measurement noise. To demonstrate that ML model can actually learn even the shallowest SHB effect at longer wavelengths, 200-span link is simulated using the ML model. In the simulation, an ideal GFF with no excess loss is assumed. GFF shape is fixed for all 200 amplifiers and matched perfectly to the gain shape obtained for the flat input with 7.7 dBm. A wavelength-independent span loss of 10.3 dB is assumed, matching the average gain after flat input and GFF. Fibre nonlinearity, and drooping effects are neglected as well for better isolation of SHB. The input of the first amplifier are the measured data, and afterwards they are propagated through the link replacing all the EDFAs with the prediction of the ML model.

Since the ground truth regarding the SHB after 200 spans is missing in our work, we cannot evaluate accuracy of the results in some circumstances however, similarity with the experimental is remarkable. It also shows some well-known features of SHB, for instance the saturation depth gets shallower and wider for the longer wavelengths.

CONCLUSION

A direct comparison between machine learning model and black box model of the same EDFA is presented. It is found that ML model outperforms the BB by a large margin. It is shown by direct measurements that ML does learn SHB, an inhomogenous effect that BB models cannot by design. Furthermore, the average RMSE of 0.016 dB achieved by the ML model is best performance reported to the best of our knowledge.

At this point, while we have presented this disclosure using some specific examples, those skilled in the art will recognize that our teachings are not so limited. Accordingly, this disclosure should only be limited by the scope of the claims attached hereto.

The invention claimed is:

1. A method for data-driven modeling of erbium doped fiber amplifiers (EDFA) by neural networks, the method comprising:

operating a measurement arrangement including an amplified spontaneous emission (ASE) source, an optical spectrum analyzer (OSA), and an EDFA-device under test interposed between the ASE and OSA, such that input, and output spectra are generated;

determining a power represented by spectra peaks, along with a corresponding gain;

generating a set of input node values using the determined power and corresponding gain;

training a neural network using the set of input node values; and using the trained neural network to predict the gain of a different EDFA than the one used to train the neural network.

2. The method of claim 1 wherein a reference power and estimated gain for the different EDFA is applied to the trained neural network to predict the gain of the different EDFA.

3. The method of claim 2 wherein the reference power and estimated gain for the different EDFA is determined by measuring a gain using a flat input spectrum with several input posers.

4. The method of claim 3 wherein the neural network is retrained with limited supplementary data including a flat input with varying input power levels.

5. The method of claim 4 wherein the limited supplementary data includes input spectra with varying linear tilts.

* * * * *